(12) United States Patent
Roach (10) Patent No.: US 8,731,533 B2
(45) Date of Patent: May 20, 2014

(54) METHODS AND APPARATUSES FOR RECONNECTING CALLS WITH QUALITY PROBLEMS OR RECONNECTING DROPPED CALLS

(76) Inventor: Peter Roach, Jacksonville, FL (US)

( * ) Notice: Subject to any disclaimer, the term of this patent is extended or adjusted under 35 U.S.C. 154(b) by 781 days.

(21) Appl. No.: 12/714,428

(22) Filed: Feb. 26, 2010

(65) Prior Publication Data

US 2010/0227598 A1 Sep. 9, 2010

Related U.S. Application Data

(60) Provisional application No. 61/209,002, filed on Mar. 3, 2009.

(51) Int. Cl.
*H04M 3/42* (2006.01)
(52) U.S. Cl.
USPC .......................................... 455/417; 455/436
(58) Field of Classification Search
USPC ........................... 455/412.2, 414.1, 417, 436, 455/456.1–456.6
See application file for complete search history.

(56) References Cited

U.S. PATENT DOCUMENTS

| | | | | |
|---|---|---|---|---|
| 5,697,056 A * | 12/1997 | Tayloe | | 455/513 |
| 6,633,760 B1 * | 10/2003 | Ham et al. | | 455/422.1 |
| 7,489,928 B2 * | 2/2009 | Smith | | 455/432.1 |
| 7,602,761 B2 * | 10/2009 | Lin et al. | | 370/347 |
| 8,131,220 B2 * | 3/2012 | Erceg et al. | | 455/63.1 |
| 8,195,130 B2 * | 6/2012 | Hao et al. | | 455/412.1 |
| 8,200,183 B2 * | 6/2012 | Aftelak et al. | | 455/404.1 |
| 8,280,404 B1 * | 10/2012 | Roskind | | 455/456.1 |
| 8,315,652 B2 * | 11/2012 | Grant et al. | | 455/466 |
| 8,358,978 B2 * | 1/2013 | Erceg et al. | | 455/63.1 |
| 2006/0209932 A1 * | 9/2006 | Khandekar et al. | | 375/148 |
| 2007/0207808 A1 * | 9/2007 | Park | | 455/445 |
| 2007/0254659 A1 * | 11/2007 | Paul et al. | | 455/436 |
| 2008/0076426 A1 * | 3/2008 | Nam | | 455/436 |
| 2008/0161001 A1 * | 7/2008 | Holcman et al. | | 455/436 |
| 2009/0280860 A1 * | 11/2009 | Dahlke | | 455/556.1 |

* cited by examiner

*Primary Examiner* — Kamran Afshar
*Assistant Examiner* — Khawar Iqbal
(74) *Attorney, Agent, or Firm* — Charlena Thorpe, Esq.; F. Wayne Thompson, Jr.; The Law Office of Charlena Thorpe, Inc.

(57) ABSTRACT

The invention provides methods and apparatuses covering subscriber initiated handoff to improve call quality, change networks, record a quality event, or for other purposes. The subscriber initiated handoff is primarily designed to be used in conjunction with a wireless network.

2 Claims, 4 Drawing Sheets

METHODS AND APPARATUSES FOR RECONNECTING CALLS WITH QUALITY PROBLEMS OR RECONNECTING DROPPED CALLS

RELATED APPLICATIONS

This application claims priority to and incorporates by reference in its entirety U.S. Provisional Patent Application Ser. No. 61/209,002 entitled "Methods and Apparatuses for utilizing remote origination in a mobile or landline network" and filed on Feb. 26, 2009.

FIELD

The present disclosure generally relates to communications including mobile communication and the ability to provide control and switching of calls.

BACKGROUND

Poor channel quality and dropped calls are common problems in mobile communication. When these problems occur, users have limited undesirable options to solve the problem. For instance, when a call is dropped, the user must reestablish the call after the connection to the network is reestablished. When there is a poor quality link during a call, the user either suffers with the poor quality while attempting to continue a conversation or terminates the conversation and then tries the call again. These problems cause user dissatisfaction and typically are the primary reasons for user churn among network operators.

Furthermore, there exists no mechanism for users to automatically request a credit or other benefit from the wireless network operator where there is a poor quality link or dropped call.

SUMMARY

Embodiments of the present invention include a system that includes a communication server configured to establish a voice connection between a first handset and a second handset. The voice connection includes a first connection between the first handset and a first designated device and a second connection between the second handset and either the first designated device or a second designated device. A server of the system is configured to, upon receiving a request from the first handset, disconnect the first connection and establish a third voice connection between the first handset and either the first designated device, the second designated device, or a third designated device.

Both the foregoing general description and the following detailed description are exemplary and explanatory only and are not restrictive of the invention as claimed.

DETAILED DESCRIPTION

Reference throughout this specification to "an embodiment" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Furthermore, the described features, structures, or characteristics may be combined in any suitable manner in one or more embodiments. In the following description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

In a mobile network, when the channel quality of a call is unsatisfactory, a participant of the call may say to another participant of the call, "Let me call you back" or words of similar import in an attempt to improve the voice quality of the conversation. Thereafter, the participant ends the call and then attempts to reestablish the call. Oftentimes, the channel quality of the subsequent call is improved, thereby resulting in improved voice quality and satisfaction to the caller.

Figure 2:
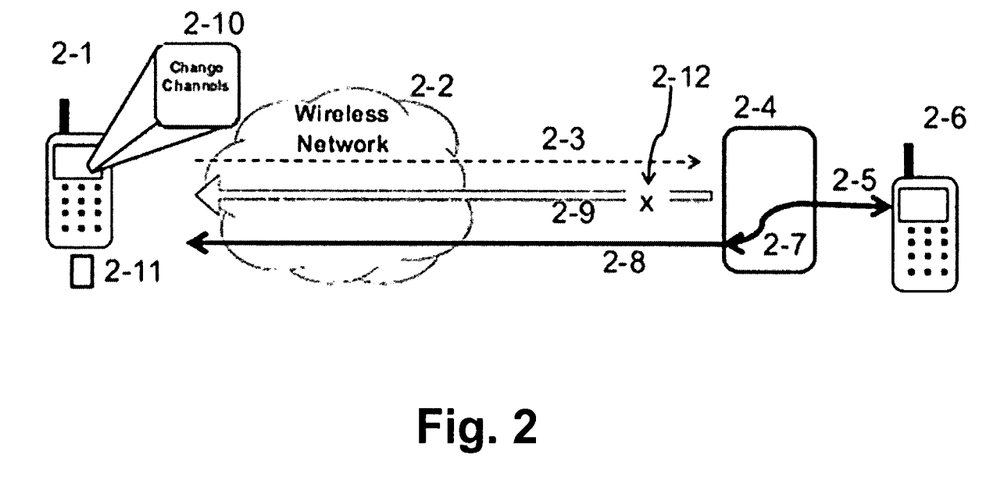
FIG. 2 illustrates a system according to an exemplary embodiment of the present invention for implementing a subscriber initiated handoff.

Embodiments of the present invention provide means for participants of a call to request a better link during a conversation without resorting to the extreme of tearing down and reestablishing the call. FIG. 2 illustrates a system for implementing a subscriber initiated handoff. The system comprises a subscriber handset 2-1, a wireless network 2-2, and a server 2-4. A caller may initiates a call using the subscriber handset 2-1 to send a message across a wireless network 2-2 to a server 2-4 requesting a call set up. Alternatively, a caller may initiate a call by receiving and a answering a call that has been routed through the server 2-4.

The call may be initiated by subscriber handset 2-1 using remote origination technology as described in U.S. Pat. No. 6,308,070 entitled "Method and apparatus for minimizing incurred charges by the remote origination of telephone calls", which is incorporated by reference. Remote origination allows for the control, decision making, and even switching of the call to be remotely located from the serving network. Remote origination is a powerful enabling technology that can be utilized to allow parties, bypass operators, over-the-top network operators, in addition to other network operators to control the logic and many of the physical attribute of switching a call. With the teaching of this disclosure, one skilled in the art will understand how many of the methods and apparatuses described herein can be hosted or utilized in the serving wireless network to provide enhanced features and services contemplated in this document. The serving wireless network can choose to use remote origination to achieve this functionality or alternatively can cause the handset to originate the call directly.

Once an initial call on channel 2-9 to handset 2-1 is established, the handset 2-1 may display a button 2-10 or other subscriber interface to indicate that the caller may attempt to improve the quality of the call. In this way, a caller may attempt to improve the voice quality of a call during a conversation by selecting button 2-10. When the caller selects button 2-10, the handset 2-1 sends a data message 2-3 to the server 2-4 to indicate that the caller desires to attempt to improve the voice quality of the call. The server 2-4 then tears down the channel 2-9 and establishes a second call on channel 2-8 to the handset 2-1. The server 2-4 then connects channel 2-5 to a second party 2-6 to the new channel 2-8 to the first party 2-1.

In an alternate embodiment of the present invention, display button 2-10 is displayed only when an event occurs that may indicate a poor quality voice connection or dropped call on channel 2-9.

In another embodiment of the present invention, handset 2-1 may include, for example, an inertia monitor to indicate a caller's desires to attempt to improve the voice quality of the call. For example, a caller may shake handset 2-1 to send a data message 2-3 to server 2-4 to request a change from one channel 2-9 to another 2-8 in an attempt to improve the voice quality of the call. In this embodiment, shaking the handset 2-1 also actively engages the caller for a period of time while a second channel 2-8 is established.

Handset 2-1 may be configured to allow a caller to set how the handset 2-1 must be shaken to request a change in channel. For example, the caller may indicate that a vigorous shake, medium shake, or light shake will trigger a channel change request. In another embodiment, the caller may set handset 2-1 to send a channel change request based on the direction (e.g., vertical, horizontal, circular, or combination) of the shake. In an alternative embodiment, the shaking parameters for requesting a change in the channel are derived based on the caller shaking the handset 2-1.

In another embodiment of the present invention, handset 2-1 may be configured to provide tactile feedback (e.g., vibration of the handset 2-1) to the caller indicating that, for example, the channel change request has been received and/or a handoff is underway.

In another embodiment of the present invention, handset 2-1 may be configured to provide visual feedback to the caller. For example, the screen background of handset 2-1 may turn red while a channel is being set up and then may turn green once the handset 2-1 has received or answered the call.

In another embodiment of the present invention, an audible indication such as a tone, announcement (e.g., "Please hold while we try to improve the quality of your call") or other signal may be transmitted on channel 2-5 to alert the subscriber on handset 2-6 that a channel change is underway. The announcement on channel 2-5 may also include customer specific alerts, advertising directed at the called party, a message from the user subscribing to the service, music selections, or other similar audible service.

In another embodiment of the present invention, an audible alert message is provided to the caller on handset 2-1 to indicate that the user initiated handoff is occurring. For example, when a caller shakes handset 2-1 to request a call handoff, handset 2-1 may be configured to play, for example, "Aargglgal." This form of feedback may relieve frustration that the caller may be experiencing due to the quality problems. The audible alert message may be played through the speaker of the handset 2-1. The audible levels of the alert messages may be the same as or similar to audible level used for voice conversations or through the speaker. Alternatively, the audible levels of the alert messages may be the same as or similar to the speaker and audio level normally used for indicating a ring signal.

Handset 2-1 may be configured to provide any combination of the above-mentioned visual, tactile, and audible indications. For example, handset 2-1 may be configured to provide visual, tactile, and audible indications individually or in combination to provide a multi-sensual user experience.

In another embodiment of the present invention, handset 2-1 is configured to indicate when channel 2-8 had been reestablished. Handset 2-1 may indicate that channel 2-8 has been established tactilely (e.g., by vibrating the handset 2-1), visually (e.g., by changing the screen or lights on the handset 2-1), or audibly (e.g., by playing an announcement such as "Sorry"). This indication can also be programmed to contain an advertising message directed at the user of handset 2-1

In another embodiment of the present invention, server 2-4 sends a data message to handset 2-6 to alert the user of handset 2-6 that a user requested handoff is occurring. This message may include graphics, video, or other visual indications to be displayed to the user of handset 2-6. The visual message may be structured to contain advertising messages.

In another embodiment of the present invention, server 2-7 sends a tone announcement such as "Please hold while we try to improve the quality" or other signal to handset 2-1 to alert the subscriber on handset 2-1 that the process to improve the quality of the phone is occurring.

In another embodiment of the present invention, the handset 2-1 or the server 2-4 monitors the quality of the voice conversation using, for example, voice recognition, speech processing, or other automated algorithm to determine if the voice quality has fallen below a predetermined threshold. When the voice quality is below the set standard, voice channel 2-9 may be disconnected 2-12 and a second voice channel 2-8 may be established to the handset 2-1. An automated monitoring feature may alleviate the need for a button 1-10 or any other type of subscriber input. I in one embodiment of the present invention, an indication is provided to the caller on handset 2-1 that a new channel is being established. This indication may be in the form of a tone, changes to the screen, vibration, or other means of alerting the user and may alternatively contain advertising messages. In one embodiment, during the establishment of the second voice channel 2-8, an automatic answer function built into handset 2-1 allows for the call placed from the server 2-4 to be automatically answered by the handset 2-1 to establish channel 2-8. The automatic answer function may be triggered, for example, based on the timing of the incoming call from server 2-4 in relationship to a data message requesting a channel change that was sent for the handset 2-1 or the server 2-4. Alternatively, the automatic answer function may be trigged based on a calling line ID or other distinguishing indicator (e.g.; IP address for voice over IP calls) associated with the voice channel 2-8 for the incoming call from the server 2-4.

In another embodiment of the present invention, handset 2-1 is capable of identifying and automatically answering the incoming call on voice channel 2-8 to improve the quality of the call.

In another embodiment of the present invention, server 2-4 is configured to record the location of handset 2-1 when the caller requests to change channels to improve the quality of the call. The location information may be transmitted to and stored at server 2-4 for use by the mobile network operator to improving the quality of the network. The location information also may be used by the mobile network operator to compare network coverage or quality between competing networks. In one embodiment, when the caller requests to channel channels to improve the quality of the call, the handset 2-1 may be configure to automatically scan other available networks to determine if another network provides better coverage in the problem area. The other network may then provide advertisement to the caller of handset 2-1. For example, assume that a handset 2-1 is served by a mobile network operator and encounters a quality problem. The user of handset 2-1 requests to change channels to improve the quality of the call and the handset 2-1 automatically scan other available networks and determines that another mobile network operation has better coverage in the area. The other network may provide an advertisement to be displayed on handset 2-1 indicating this better coverage. In another embodiment, handset 2-1 may be configured to display information on multiple networks and provide a comparison of the coverage as a visual message while the user of handset 2-1 waits for a connection to be reestablished.

In another embodiment of the invention, handset 2—may be configured to monitor the link quality of other networks and, if it is desirable, move the call 2-9 to a new network. To move a call 2-9 to another network, handset 2-1 may send a data message 2-3 to server 2-4 requesting a new call. Handset 2-1 then may log onto the new network and await the new call 2-8 to arrive on the new network. During this new call set-up, channel 2-5 to handset 2-6 is maintained. The new call on channel 2-8 may be processed and set up before the handset 2-1 moves to the new network. Alternatively handset 2-1 may register on the new network while maintaining the call on channel 2-9 until the new call 2-8 arrives or should have arrived (provided some type of timer is used) on the new network. The server 2-4 may be programmed in any manner to make the process of handing off the call to the new network as seamless as possible. For example, server 2-4 may monitor the channel 2-8 to determine if the call has been answered and then tear down channel 2-9. Server 2-4 may conference the two calls on channels 2-9 and 2-8 to allow the voice conversation from handset 2-1 to continue while the channels are set up and torn down. Server 2-4 may wait until answer supervision is received on channel 2-8. Server 2-8 may monitor for alerting on channel 2-8 and when the alerting is terminated, bridge calls on channels 2-9 and 2-8 and channel 2-5. Sever 2-4 may implement any other techniques for bridging the channels 2-9 and 2-8 to reduce the interference to the call between handset 2-1 and handset 2-6.

Information regarding the quality problem encountered when using the communication link 2-10 including the nature and location of the quality problem may be transmitted to and stored on server 2-4 (or other suitable server in the network) for later use. This quality information may be used for requesting a credit, refund, or other similar reimbursement from the serving mobile operator. This information may be recorded and transmitted to the serving mobile operator on an individual basis or, alternatively, the operator of server 2-4 may aggregate this information for all of the impacted users of the same network. In one embodiment of the present invention, this information may be supplied to handset 2-1 to facilitate t a credit request. The network operator or other qualified entity may use this information in network 2-2 planning, network 2-2 upgrades, network 2-2 maintenance, competitive positioning, advertising a competing network's quality, or other similar analysis designed around maintaining, growing, or marketing the wireless network 2-2.

The function of tearing down a channel 2-9 and reestablishing a separate channel 2-8 to improve call quality can be performed by software code in the handset 2-1 or software code on a separate subscriber identity module (SIM) 2-11 designed to be used in conjunction with handset 2-1. When poor call quality has been detected, for example, as call described above using a dedicated button 2-10, inertia monitor or accelerometer, automatic voice recognition or link quality monitoring, or any other method, a signal is transmitted to the handset 2-1 or SIM 2-11. Software on the handset 2-1 or SIM 2-11 may cause the first channel 2-9 to be torn down and reestablish the voice conversation on a second channel 2-8. The handset 2-1 or SIM 2-11 may perform this function by sending a data message 2-3 to the server 2-4 to perform a remote origination as described herein. In an alternate embodiment, handset 2-1 or SIM 2-11 may cause the handset 2-1 to drop the call directly without invoking a remote origination call from server 2-4. For example, the entire channel from handset 2-1 to handset 2-6 may be torn down and handset 2-1 may reestablish the call directly to handset 2-6. Thus, remote origination is not required for either the first call or the second call. Instead, handset 2-1 or SIM 2-11 is programmed to recognize the trigger for handoff and respond by tearing down the first channel and establishing a second channel. Unfortunately, in this embodiment, the user on handset 2-6 would be disconnected 2-12 from the conversation.

The remote origination platform may be located in the serving wireless network 2-2 for handset 2-1, in a third party network, or even in the network providing service to handset 2-6. With the teachings of this disclosure, one skilled in the art may implement such systems. Furthermore, other functionality described herein may be achieved utilizing features or services in the serving network 2-2, such as release link trunks, call park, call transfer functionality, or other similar services offered by the serving network. With the teachings of this disclosure, one skilled in the art may implement such functionality. Still further, the handset 2-1 functionality described herein may be programmed onto SIM 2-11 that is designed to be used in conjunction with a handset or other terminal. With the teachings of this disclosure, one skilled in the art may program and design such a SIM 2-11.

With the teachings of this disclosure, one skilled in the art may design a handset 2-1 to initiate the call on channel 2-8 to server 2-4 to reestablish the voice conversation. The handset 2-1 may send a data message 2-3 that includes quality information, call validation, or other relevant information in conjunction with the call.

If remote origination is not used, subscriber initiated handoff may be implemented in the serving network 2-2. In this way, channel 2-5 may be maintained while reestablishing the call on channel 2-8 to handset 2-1.

Figure 3:
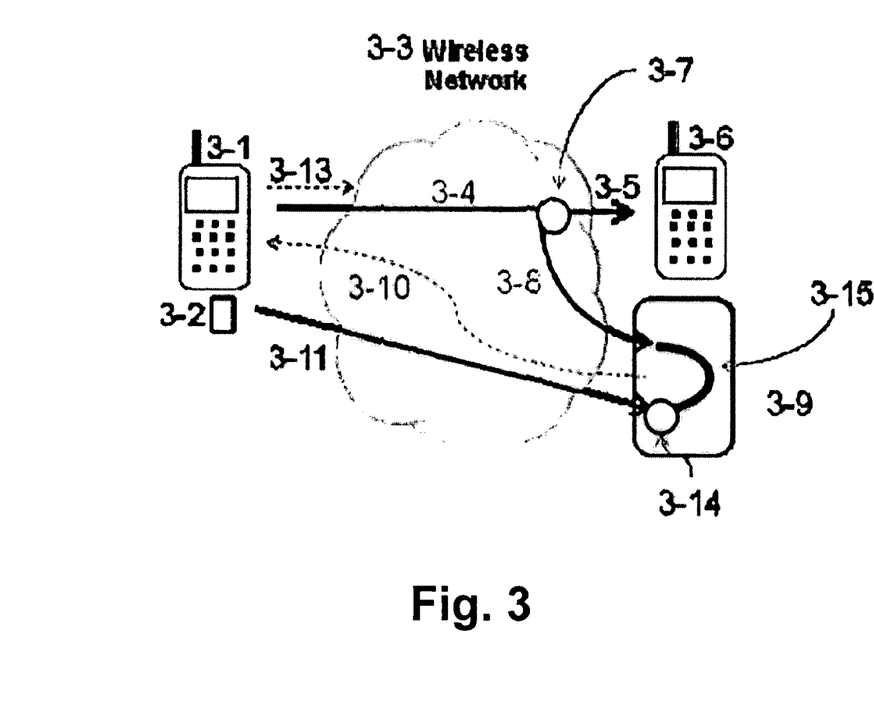
FIG. 3 illustrates a system according to an alternate embodiment of the present invention for implementing a subscriber initiated handoff.

Another embodiment of the present invention will be described with reference to FIG. 3. In FIG. 3, Handset 3-1 may activate a subscriber initiated handoff utilizing one of the many user initiated or automatic mechanism described herein. Once a subscriber initiated handoff is triggered, handset 3-1 may send a data message 3-13 to the wireless network 3-3.

In one embodiment of the invention, data message 3-13 triggers the wireless network 3-3 to transfer 3-8 the call on channel 3-5 to a services node 3-9. In one embodiment, the services node 3-9 then may supply to the handset 3-1 a data message 3-10 that provides a temporary number (e.g., a temporary Park Number, TPN) 3-14 where the call may be retrieved. The TPN may be assigned from a group of reusable numbers assigned to the services node 3-9. The handset 3-1 may then initiate a call on channel 3-11 to the services node 3-9 using the TPN 3-14. When the call on channel 3-11 is answered, the services node 3-9 bridges 3-15 the new call on channel 3-11 with the existing call on channel 3-5.

In another embodiment of the present invention, handset 3-1 transfers the call on channel 3-5 to a directory number associated with handset 3-1. The directory number may be a dedicated number associated with the handset or, alternatively, may be derived by prepending a special code to the handset's 3-1 telephone number and then using this code as a routing number for the services node 3-9. The services node 3-9 recognizes this incoming call from handset 3-1 and treats the call as a subscriber initiated handoff. Handset 3-1 first disconnects from the first channel 3-4 and dials the services node using the same prepended number. The services node 3-9 then connects the incoming call on channel 3-11 with the call on channel 3-5 previously placed on the services node 3-9.

The handset's 3-1 telephone number may be modified in numerous manners to provide the functionality outlined in this disclosure. For example, the leading digits of the phone number may be replaced with new numbers. For instance, for North America numbers, these leading digits of the phone number may be non-numbering plan numbers such as 000 for the area code. In another embodiment, the handset's 3-1 telephone number may be post-pended with specific numbers. Any form of number substitution may be used as long as the handset 3-1 may determine the number to dial for the call on channel 3-11 without requiring a second data message 3-10.

In another embodiment of the invention, services node 3-9 performs the above functionality off the network. For example, services node 3-9 may be a Google Voice (a telephony service offered by Google to bypass many of the cellular network provider's services) services node. In this example, the call would be transferred using the Google Voice number assigned to the user of handset 3-1 (or some modification of the number). The services node 3-9 may then park the call. Handset 3-1 then may call on channel 3-11 the corresponding number 3-14 on the services node 3-9 and the calls on channel 3-11 and 3-5 would then be bridged together 3-15.

In another embodiment of the invention, handsets 3-1 and 3-6 are programmed to arrange a meet-me conference should a dropped call occur. In one embodiment, handset 3-1 and handset 3-6 are both programmed or provided with a meet me number should the call be dropped. The meet me number may be derived by software in the handset 3-1, 3-6 based on, for example, one of the phone numbers associated with one of the handset 3-1, 3-6 on the call or based on some routing number derived from the phone numbers associated with the handset 3-1, 3-6 by, for example, prepending the phone number of the originating party with a special code.

In another embodiment of the present invention, the service node may utilize network services, such as release link trunks, to allow for the bridged call to be placed back to the network thus allowing more capacity for the services node 3-9 to handle more traffic. With the teachings of this disclosure, one skilled in the art may implement such systems.

In another embodiment of the present invention, voice over IP (VoIP) transport may be used to permit the bridging 3-15 of the call legs 3-5, 3-11 in the services node or in the network. With the teachings of this disclosure, one skilled in the art may implement such a system.

In another embodiment of the present invention, the functionality and logic described as residing on the handset 3-1 may be placed onto a SIM 3-2 for example, to make the logic transportable between handsets. With the teachings of this disclosure, one skilled in the art may program and design such a SIM 3-2.

Figure 1:
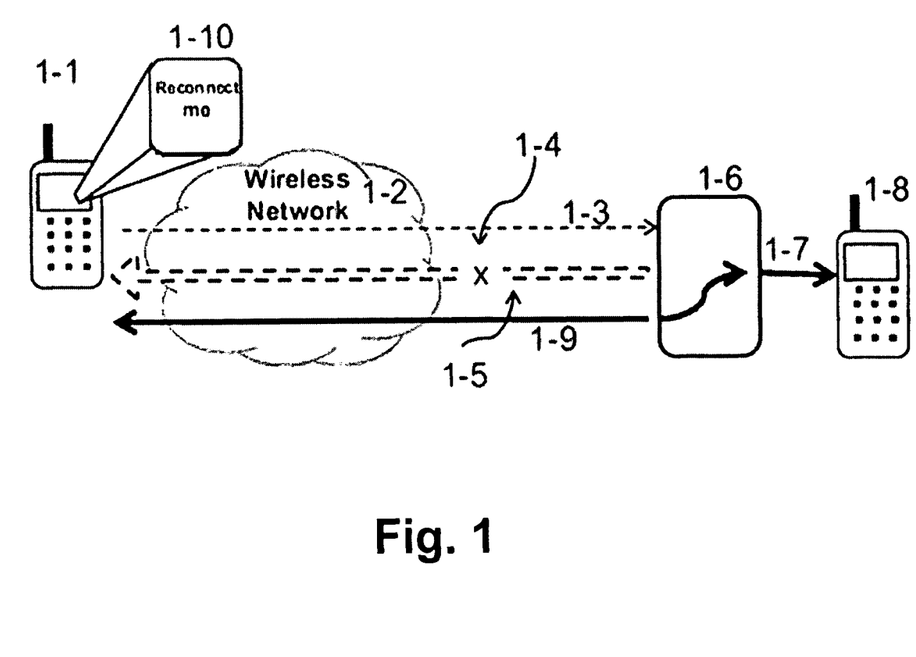
FIG. 1 illustrates a system according to an exemplary embodiment of the present invention for reconnecting dropped calls.

Another embodiment of the present invention will be described with reference to FIG. 1. In FIG. 1, handset 1-1 may use the functionality described herein to handle a dropped call. The dropped call event may be handled similarly to the subscriber initiated handoff when using Remote Origination. In this implementation, the dropped call event may be recognized by a user input mechanisms described herein such as a button or soft key 1-10 or an accelerometer to recognize a pattern of movement such as shaking the handset.

In an alternate embodiment, a dropped call also may be recognized using handset 1-1 based software designed to determine when an abnormal termination 1-4 of the call has 1-5 occurred such as when the call on channel 1-5 has not been correctly terminated by the network 1-2 or the user.

In an alternate embodiment of the present invention, a dropped call also may be recognized using network 1-2 based analysis that determines when the call has been terminated in a manner to indicate a dropped call.

In one embodiment of the present invention, user input selected is stored locally on the handset 1-1 while the handset 1-1 is not connected to a network 1-2 and transmitted to the network 1-2 or the server 1-6 when the handset 1-1 is reconnected to the network 1-2.

In another embodiment of the present invention, a timer is provided on the handset 1-1 to determine if an excessive amount of time has elapsed between the user input and the new network connection on channel 1-9. In such a case, the handset 1-1 may be programmed to not send a message 1-3 that is intended to result in a reconnection of the dropped call. In this event, it may still be desirable to send the message 1-3 informing the network or the server of the dropped call. This message may be utilized to help improve network 1-2 quality or to provide information to request credit from the network 1-2 provider for the dropped call event.

In an alternate embodiment of the present invention, a service node 1-6 may also automatically detect a dropped call 1-4 by recognizing a call termination from the wireless network 1-2 while the user not subscribing to the service 1-8 continues to hold the line 1-7 for a period of time after the handset 1-1 disconnects 1-4 from the network 1-2 servicing the handset 1-1.

In one embodiment of the present invention, the service node 1-6 may provide an announcement or other audio or visual indication to the handset 1-8 not subscribing to the service. This message primarily may be designed to inform the user of the handset 1-8 to hold the line if they would like to reconnect the call. The audio or visual indication may provide the status of the connection attempt such as a status bar for a visual indication or "connecting-ringing" for an audio indication. The audio or visual indication also may provide an advertising message (such as, "this dropped call is being automatically reconnected by Goodies BC powder— we take the headaches out of life") to the user of the handset 1-8 that is awaiting the reconnection.

In one embodiment of the present invention, the wireless network 1-2 parks the call on channel 1-7 on the services node 1-6 when a call is dropped 1-4. The wireless network 1-2 may park the call on an address that is known to the wireless handset 1-1 so that the wireless handset 1-1 may retrieve the call on channel 1-7 when the handset 1-1 is reconnected to the network 1-2.

The wireless services 1-6 node may register with the home location register (HLR) of the wireless network 1-2 to request an alert when the wireless handset 1-1 returns to the network 1-2.

A location services (e.g., global positioning, cell site positioning, RF spectrum sniffing/comparison to known locations, etc.) may be included on handsets 1-1, 2-1, or 3-1 to determine the location of the handset when the subscriber initiated handoff or dropped call 1-4 event occurs. This location information may be stored on handset 1-1, 2-1, or 3-1 or, alternatively, may be transmitted to and stored by the servers 1-6, 2-4, or 3-9 to, for example, assist in requesting a credit from the service provider for the event and/or to be used to help improve network quality and/or to assist in selecting the serving network from the handset. This information also may be provided to other network operators to be used in network comparison or in advertising their service quality visa vie the network dropping the call or experiencing the service quality problem.

Figure 4:
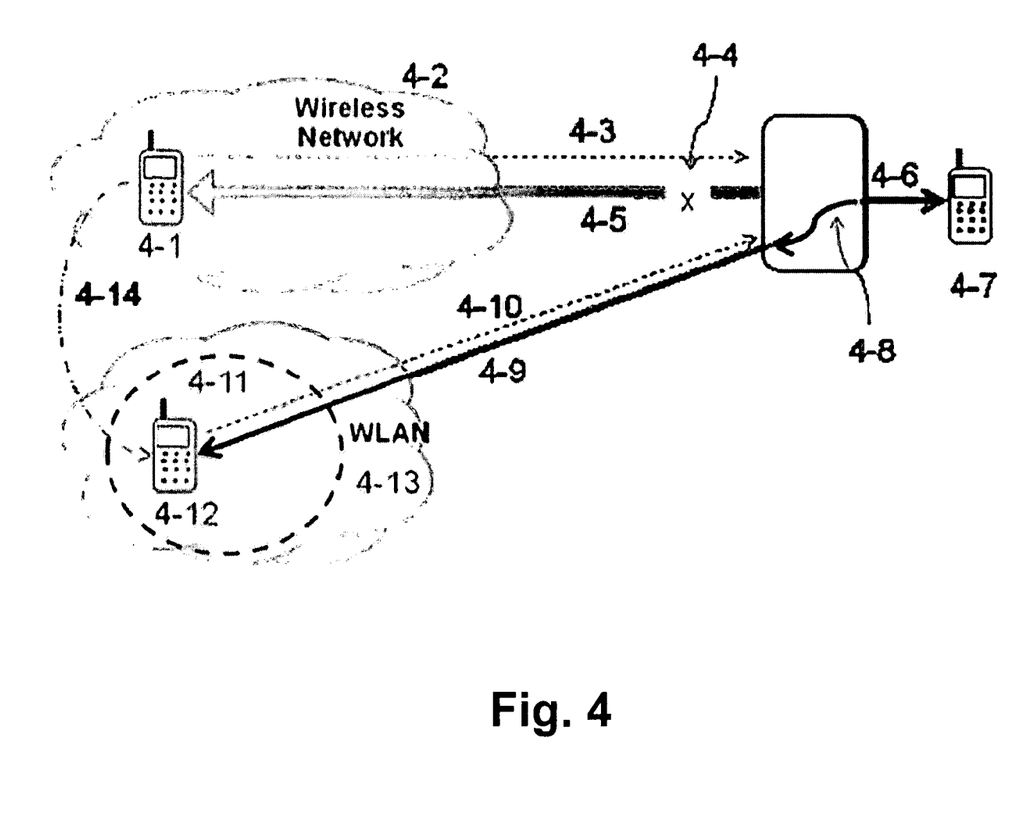
FIG. 4 illustrates a system according to an exemplary embodiment of the present invention for implementing a handoff between multiple networks.

Referring to FIG. 4, if known, the location of the handset 4-1 also may be used to determine how the service node 4-8 should react to one of the above mentioned triggers for a subscriber initiated handoff. For example, if the handset 4-1 moves to position 4-12 served by an associated wireless network such as a wireless local area network (WLAN) 4-13, the server 4-8 may be programmed to recognize that the handset 4-12 is in proximity 4-11 of the WLAN 4-13. Server 4-8 may determine the location of handset 4-12 by using triangulation, global positioning system (GPS), assisted global positioning system (AGPS), recognition of the WLAN signal, blue tooth signal, or other information derived from the network or from the handset 4-12.

In the depicted implementation, the handset 4-12 signals 4-10 the request for subscriber initiated handoff from the WLAN 4-13. This subscriber initiated handoff signal 4-10 is recognized as originating from WLAN 4-13. This may be accomplished by a unique signal from the WLAN 4-13 such as a static IP address or alternatively the designation the signal is originating from the WLAN 4-13 may be inserted by the handset 4-12. Once the signal 4-10 is received by the server 4-8, the server 4-8 may disconnect 4-4 the voice conversation on channel 4-5 and then connect the voice conversation on channel 4-6 to the new voice channel 4-9.

With the teachings of this disclosure, one skilled in the art will understand how to implement a system to achieve the internetwork handoff using an access point base station, femtocell, small cellular base station, home based base station, wireless private branch exchange, or other similar wireless networks.

With the teachings of this disclosure, one skilled in the art will understand how to host the internetwork subscriber initiated handoff in the wireless network, through a private branch exchange (PBX), located on an internet protocol PBX, or other network element capable of supporting voice or data communications.

With the teachings of this disclosure, one skilled in the art will understand how to the second channel 4-10 may be set up to the handset 4-1 before the first channel 4-5 is terminated (i.e., soft handoff). This may involve bridging of the two channels 4-10, 4-5 for some period of time while the handoff is accomplished.

With the teachings of this disclosure, one skilled in the art will understand how, if Soft Handoff occurred, the server 4-8 can selectively mute one portion of the voice channel 4-5, 4-6 in order to maintain a continuity of communications without distracting overlap during the handoff 4-8 process.

With the teachings of this disclosure, one skilled in the art will understand how billing records may be recorded in server 4-8, the network 4-2 and/or 4-13, or the wireless handset 4-12 and aggregated to present a signal billing event on the subscriber's bill to make the call appear as a single call.

With the teachings of this disclosure, one skilled in the art will understand how one of the aforementioned network based subscriber initiated handoff mechanisms outlined in this disclosure may be utilized to perform the inter network subscriber initiated handoff.

With the teachings of this disclosure, one skilled in the art will understand how to place the functionality described as being on the wireless handset onto the SIM or to split the functionality between the handset and the SIM.

The terms subscriber initiated handoff, dropped call reconnection, and other descriptions of the technology can be used interchangeably and should not be construed to limit the features described for any one of these services to only that service. All of the features and implementations described in this disclosure may be used on any one of the services described.

Exemplary embodiments of the present invention or component thereof may have been described above with reference to a block diagram(s) and a flow illustration(s). It will be understood that the blocks and/or flow illustrations including corresponding descriptions may be implemented by various means as discussed above including computer program instructions. For example, the functions described in relation to servers, networks, or handset may be implemented using computer program instructions. With the teachings of this disclosure, one skilled in the art will understand how to prepare such computer program instructions.

These computer program instructions may be loaded onto a general purpose computer, special purpose computer, or other programmable data processing apparatus to produce a machine, such that the instructions which execute on the computer or other programmable data processing apparatus create a means for implementing the functions specified in the flow diagram(s) or blocks.

These computer program instructions may also be stored on a computer-readable memory that can direct a computer or other programmable data processing apparatus to function in a particular manner, such that the instructions stored on the computer-readable memory produce an article of manufacture including computer-readable instructions for implementing the function specified in the flow illustration or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flow illustrations or blocks.

Based on the foregoing, it can be seen that the present invention provides methods and apparatuses for improving call quality, reconnecting a dropped call, or handing off between multiple networks. Many other modifications, features and embodiments of the present invention will become evident to those of skill in the art having the benefit of the teachings presented in the forgoing descriptions and the associated drawings. It should be appreciated, therefore, that many aspects of the present invention were described above by way of example only and are not intended as required or essential elements of the invention unless explicitly stated otherwise. Accordingly, it should be understood that the foregoing relates only to certain embodiments of the invention and that numerous changes may be made therein without departing from the spirit and scope of the invention as defined by the following claims. It should also be understood that the invention is not restricted to the illustrated embodiments and that various modifications can be made within the scope of the following claims. Furthermore, although specific terms are employed herein, they are used in a generic and descriptive sense only and not for purposes of limitation.

What is claimed is:

1. A mobile telephone for use with a telephony network, for use with a data server platform, and for use with a data messaging network configured to relay messages to the data server platform, said mobile telephone comprising:

circuitry for connecting said mobile telephone to at least one telephony network;

an internal data messaging device for communicating with the data network;

a user input interface configured to receive an input for initiating a data message indicating poor quality telephony service; and a transmitter configured to transmit a data message requesting the first telephony channel to be discontinued and to establish a second telephony channel, wherein the user input interface includes an accelerometer; and wherein the user input interface is configured to recognize the shaking of the handset to initiate the data message.

2. The mobile telephone of claim 1 wherein the user input interface is configured to recognize the shaking pattern used to trigger the sending of the data message by analyzing one user instance of shaking and recording the pattern to be later used as a trigger for sending the data message.

\* \* \* \* \*